US007975984B1

(12) United States Patent  (10) Patent No.: US 7,975,984 B1
Novruzov et al.  (45) Date of Patent:  Jul. 12, 2011

(54) PACKINGLESS HERMETIC VALVE WITH HARMONIC DRIVE

(75) Inventors: Samir Novruzov, Katy, TX (US); Hamid Kurbanov, Baku (AZ)

(73) Assignees: Samir Novruzov, Katy, TX (US); Ilgun Hamid Qurbanov, Baku (AZ)

( * ) Notice: Subject to any disclaimer, the term of this patent is extended or adjusted under 35 U.S.C. 154(b) by 0 days.

(21) Appl. No.: 12/538,861

(22) Filed: Aug. 10, 2009

Related U.S. Application Data

(60) Provisional application No. 61/188,366, filed on Aug. 8, 2008.

(51) Int. Cl.
 *F16K 31/44* (2006.01)
(52) U.S. Cl. ............... 251/274; 251/223; 251/335.1; 251/268; 74/17.8
(58) Field of Classification Search ............ 251/218, 251/274, 266, 267, 268, 335.1, 223; 74/17.8
See application file for complete search history.

(56) References Cited

U.S. PATENT DOCUMENTS

| | | | | | |
|---|---|---|---|---|---|
| 2,780,233 | A | * | 2/1957 | Volpin | 137/315.29 |
| 2,979,964 | A | * | 4/1961 | Musser | 74/424.75 |
| 3,077,792 | A | * | 2/1963 | Kinderman | 74/640 |
| 3,159,039 | A | * | 12/1964 | Stiff | 74/17.8 |
| 3,868,867 | A | * | 3/1975 | Hoos | 475/182 |
| 3,979,971 | A | * | 9/1976 | Generke et al. | 475/7 |
| 4,557,153 | A | * | 12/1985 | Ulbing | 74/2 |
| 5,893,565 | A | * | 4/1999 | Hill et al. | 277/430 |
| 6,772,655 | B2 | * | 8/2004 | Poehlau | 74/640 |
| 7,017,882 | B2 | * | 3/2006 | Marsh et al. | 251/77 |
| 7,412,910 | B2 | * | 8/2008 | Osle | 74/424.94 |
| 7,527,130 | B2 | * | 5/2009 | Baudendistel et al. | 188/72.8 |

* cited by examiner

*Primary Examiner* — Stephen M Hepperle
*Assistant Examiner* — Andrew J Rost
(74) *Attorney, Agent, or Firm* — Kenneth A. Roddy

(57) ABSTRACT

Hermetic gate valves and globe valves having a bonnet assembly that does not require stem packing and includes a harmonic drive and locking mechanism. The bonnet assembly includes a main body which is sealingly engaged on the valve body and includes an elongate tubular portion that completely encloses the valve stem and has a sidewall with an internally threaded portion formed of a material so as to be relatively flexible radially inward toward the valve stem, and is surrounded by an outer sleeve having a sidewall formed of a material so as to be relatively rigid radially and defining an annulus therebetween. A roller assembly rotatably disposed in the annulus includes pairs of diametrically opposed rollers including a pair of wave generator rollers positioned to rotatably engage the exterior of the tubular portion and press it radially inward to assume an elliptical configuration such that the threads of the tubular portion are engaged with the exterior threads of the valve stem at two diametrically opposed locations, with intermediate diametrically opposed locations of non-engagement. A removable handwheel keyed to the roller assembly rotates the rollers such that the engaged threads at two diametrically opposed circumferentially spaced locations, with intermediate diametrically opposed locations of non-engagement causes relative motion axially to convert the rotary motion to linear motion thereby driving the valve stem and the valve element at the bottom end thereof longitudinally between the open and closed positions.

17 Claims, 4 Drawing Sheets

PACKINGLESS HERMETIC VALVE WITH HARMONIC DRIVE

CROSS REFERENCE TO RELATED APPLICATION

This application claims priority of U.S. Provisional Application Ser. No. 61/188,366, filed Aug. 8, 2008, the pendency of which is extended until Aug. 10, 2009 under 35 U.S.C. 119(e)(3).

BACKGROUND OF THE INVENTION

1. Field of the Invention

This invention relates generally to rising stem gate and globe valves and actuators, and, more particularly, to packingless hermetic rising stem gate and globe valves which have a harmonic drive.

2. Background Art

Conventional gate valves are typically classified as either "rising stem" or "non-rising stem" valves. On the a "non-rising stem" gate valve, the valve stem is threaded on the lower end into the gate and as the handwheel on the stem is rotated, the gate travels up or down the stem on the threads, while the stem remains vertically stationary. In a "rising-stem" gate valve, the stem is attached to the gate at the lower end such that the gate and the stem rise and lower together as the valve is operated. In conventional globe valves, a horizontal disk or a plug is connected at the bottom end of the stem to open or close fluid flow through the valve as the stem is raised and lowered. The present invention is particularly suited for use with "rising-stem" valves, such as gate valves and globe valves.

Conventional gate valves generally comprise a valve body having inlet and outlet conduits with a chamber therebetween and the gate is disposed between a pair of gate seats mounted within the chamber and the upper end of the valve stem is externally threaded and threadedly engaged on an internally threaded portion of the valve bonnet wherein the threaded portions of the stem and bonnet are completely engaged circumferentially and the stem is typically sealed with the bonnet by means of a seal such as an o-ring, compressed sealant, or chevron packing.

When the valve is in its closed position, pressure upstream acts to urge the gate against the contact face of the downstream valve seat with a force proportional to pressure, which increases the frictional forces between the gate and downstream seat, which in turn increases the force necessary to rotate the stem to open the valve. The complete circumferential engagement of the threaded portions of the stem and the bonnet also increases the frictional contact surface area, which in turn increases the force necessary to rotate the stem to open or close the valve.

The stem packing sealing systems described above are subject blow out under high pressure and to wear and leakage over time under normal operating conditions, and thus require periodic replacement or maintenance to maintain the integrity of the seal.

"Harmonic drive" gear trains are known in the art. In one known design, a motor rotates a "wave generator" which is an oval or elliptical shaped member, which flexes diametrically opposite portions of a surrounding flex-spline gear, which is inside an inner gear. As the diametrically opposite teeth of the flex-spline gear contact the teeth of the outer gear, the rotatable one of the gears rotates with respect to the non-rotatable one of the gears.

"Harmonic screw" actuator devices are also known wherein rotary motion of a power input component is converted into linear motion of an output component by means of a strain wave imposed upon a flexible sleeve member, which is flexed into intermittent screw engagement by a member which is typically motor-driven to rotate relative to the periphery of the flexible sleeve. Devices of this general type are typically employed to operate levers, arms, cranks, slides or the like, such as for opening and closing doors, gates, slides, butterfly damper valves, etc.; and wherever push-pull power outputs are required.

Musser, U.S. Pat. No. 2,979,964 discloses a linear actuator with a nut element having an inside thread, a screw element having an outside thread within the nut, one of the nut and the screw elements being relatively rigid radially and the other being relatively flexible radially, the threads on the nut and the screw being of the same hand, of the same thread form and the same pitch, the threads of the nut and the screw engaging at circumferentially spaced locations with intermediate locations of non-engagement, and a wave generator for deflecting the flexible element into engagement with the other element at the plurality of locations and for progressing the locations of engagement of the threads around the circumference. In one embodiment, the wave generator is an external circular member having an ellipsoidal internal surface that surrounds the nut and causes the cross section of the nut and the interior contour of the nut at the threads to be ellipsoidal engaging the screw threads at circumferentially spaced locations whereby rotation of the external wave generator by a spanner wrench causes relative motion axially between the screw and the nut.

Hoos, U.S. Pat. No. 3,868,867 discloses a valve actuator utilizing a differential harmonic drive which includes three or more coaxial wheels. A wave generator wheel carries rotatable planet shafts to orbit them around the other coaxial wheels, a stationary or reference wheel, and one or more rotatable output wheels. Driving engagements between the stationary wheel and its orbiting planet wheels impart rotation to the planet shafts, so that driving planet wheels on the same shafts rotate the output wheels as they orbit around them. The stepped-up drive ratio imparted by the stationary wheel is different from the stepped-down ratio between the output wheel and its planet wheels, and the differential governs the overall ratio of the system. For a variation in overall drive ratio, either of two or more output wheels may be activated selectively or the output wheel and its associated planet wheel may constitute a variable ratio drive system.

Gernerke et al, U.S. Pat. No. 3,979,971 discloses a differential drive in which a reference sprocket is stationary for power drive and rotated for manual drive. In power drive, planet sprockets are orbited around the reference sprocket and rotated thereby. Drive planet sprockets on the same shafts drive an output sprocket at a slightly different ratio from the reference drive as they orbit around it, whereby there is a slow net rotation imparted thereto. In manual drive, the planet shaft axes are fixed and the reference wheel is rotated to drive the planet sprockets and rotate the output sprocket.

Ulbing, U.S. Pat. Nos. 4,557,153 and 4,848,184 discloses improved harmonic screw type actuators wherein rotary motion of the power input component is converted into linear motion of the output component by means of a strain wave imposed upon a flexible sleeve member of the assembly, which is flexed into intermittent screw engagement by a member which is motor-driven to rotate relative to the periphery of the flexible sleeve; thereby causing progressively advancing/retreating inter-engagements of thread-like surfaces formed on the axially stationary and axially movable components of the system.

Pochlau, U.S. Pat. No. 6,772,655 discloses a harmonic drive embodied in a hollow gear. The harmonic drive directly provides a given correcting translatory variable which is defined by the speed of rotation of the output ring and motor driven harmonic generator when the output ring axially displaces a threaded rod which freely extends in a coaxial manner through a longitudinal bore in the harmonic drive and engages with the output ring, the axial displacement occurring as a result of the rotational movement of the inner thread of the output ring, whereby the threaded rod is secured to the housing and prevented from rotating. The threaded rod can move in a linear manner in relation to the gear motor when the gear motor is installed in a stationary manner or when the treaded rod is installed in a stationary manner.

Marsh et al, U.S. Pat. No. 7,017,882 discloses a valve assembly that includes a valve stem which is connected with a valve and a drive member disposed in engagement with the valve stem. A gear assembly which includes a harmonic drive unit disposed in a coaxial relationship with the valve stem is operable to rotate the drive member to effect axial movement of the valve stem. The harmonic drive unit includes a flex spline which extends around a portion of the valve stem, a rigid circular spline which extends around a portion of the valve stem; and a wave generator which effects deflection of at least a portion of the flex spline.

Osle, U.S. Pat. No. 7,412,910 discloses a mechanism for transforming a rotational movement into a linear movement, comprising a non-deformable nut, that is prevented from rotating but not from axially moving, a radially deformable tubular screw, having freedom of rotation but not of axial movement and having a pitch equal to that of the nut but of a slightly external smaller diameter than the internal diameter of the nut. A pushing device inside the screw, with the ability to rotate and to push against the internal wall surface of the screw at least at three circumferentially equidistant points so as to radially deform the screw wall outwards, until bringing the screw wall to rest against and screw into the nut at an equal number of points. The pushing device may be independent rolling elements such as rolling bearings on a core on a support or may be a cam in contact with the screw or through rolling elements.

Baudendistel et al, U.S. Pat. No. 7,527,130 discloses a harmonic drive linear actuator which includes a first annular member defining a longitudinal axis and lying on a plane perpendicular to the longitudinal axis and is relatively flexible along a direction parallel to the plane. A second member is substantially coaxially aligned with the first member to define opposed substantially cylindrical surfaces fixed for non-relative rotation about the longitudinal axis. An actuator is provided for flexing the first annular member into at least two spaced-apart points of contact between the opposed surfaces and for sequentially flexing the first member to rotate the at least two points of contact circumferentially about the axis. The first and second surfaces define cooperating thread-forms thereon, which selectively engage to effect controlled, bidirectional relative axial displacement between the members in response to sequential flexure of the first member. The linear actuator can be conjoined with an actuator piston of a vehicle brake caliper assembly.

SUMMARY OF THE INVENTION

The present invention overcomes the aforementioned problems and is distinguished over the prior art in general, and these patents in particular by hermetic gate valves and globe valves having a bonnet assembly that does not require stem packing and includes a harmonic drive and locking mechanism. The bonnet assembly includes a main body which is sealingly engaged on the valve body and includes an elongate tubular portion that completely encloses the valve stem and has a sidewall with an internally threaded portion formed of a material so as to be relatively flexible radially inward toward the valve stem, and is surrounded by an outer sleeve having a sidewall formed of a material so as to be relatively rigid radially and defining an annulus therebetween. A roller assembly rotatably disposed in the annulus includes pairs of diametrically opposed rollers including a pair of wave generator rollers positioned to rotatably engage the exterior of the tubular portion and press it radially inward to assume an elliptical configuration such that the threads of the tubular portion are engaged with the exterior threads of the valve stem at two diametrically opposed locations, with intermediate diametrically opposed locations of non-engagement. A removable handwheel keyed to the roller assembly rotates the rollers such that the engaged threads at two diametrically opposed circumferentially spaced locations, with intermediate diametrically opposed locations of non-engagement causes relative motion axially to convert the rotary motion to linear motion thereby driving the valve stem and the valve element at the bottom end thereof longitudinally between the open and closed positions.

One of the significant features and advantages of the present invention is that the bonnet assembly includes a valve stem chamber which completely encloses the stem of gate and globe valves and does not require any stem packing and thereby eliminates the need to take the valve out of service to replace packing, and reduces the maintenance costs.

Another significant feature and advantage of the present invention is that the valve body chamber and stem chamber in the bonnet assembly are completely sealed from the environment and completely enclose the stem and valve elements of gate and globe valves even during linear movement and thereby making them suitable for use in handling hazardous materials and reducing the possibility of environmental pollution caused by leakage.

Another feature and advantage of the present invention is that the bonnet assembly includes a harmonic drive and locking mechanism which reduces frictional forces required to open and close rising stem gate and globe valves and extends the useful life of the valve components.

Another significant feature and advantage of the present invention is that the bonnet assembly includes a valve stem chamber which completely encloses the stem of gate and globe valves even during linear movement and thereby increases safety and reduces the possibility of environmental pollution caused by leakage.

Another significant feature and advantage of the present invention is that the bonnet assembly includes a harmonic drive mechanism that drives the stem and valve element linearly between open and closed positions and can be locked in the open or closed or intermediate positions.

Another significant feature and advantage of the present invention is that the bonnet assembly includes a harmonic drive mechanism that drives the stem and valve element linearly between open and closed positions and can be locked to prevent tampering and opening or closing of the valve by unauthorized persons.

Another significant feature and advantage of the present invention is that the bonnet assembly which includes a harmonic drive mechanism that drives the stem and valve element linearly can be easily and quickly installed on conventional existing gate valve and globe valves without modification.

A further significant feature and advantage of the present invention is that the bonnet assembly includes a harmonic drive mechanism that drives the stem and valve element between open and closed positions and is operated by a removable handwheel that is keyed to the drive mechanism such that a special handwheel is required to open or close the valve.

A still further significant feature and advantage of the present invention is that the valve and bonnet assembly including a harmonic drive and locking mechanism is simple in construction, inexpensive to manufacture and rugged and reliable in operation.

Other features and advantages of the invention will become apparent from time to time throughout the specification and claims as hereinafter related.

DESCRIPTION OF THE PREFERRED EMBODIMENTS

Figure 1:
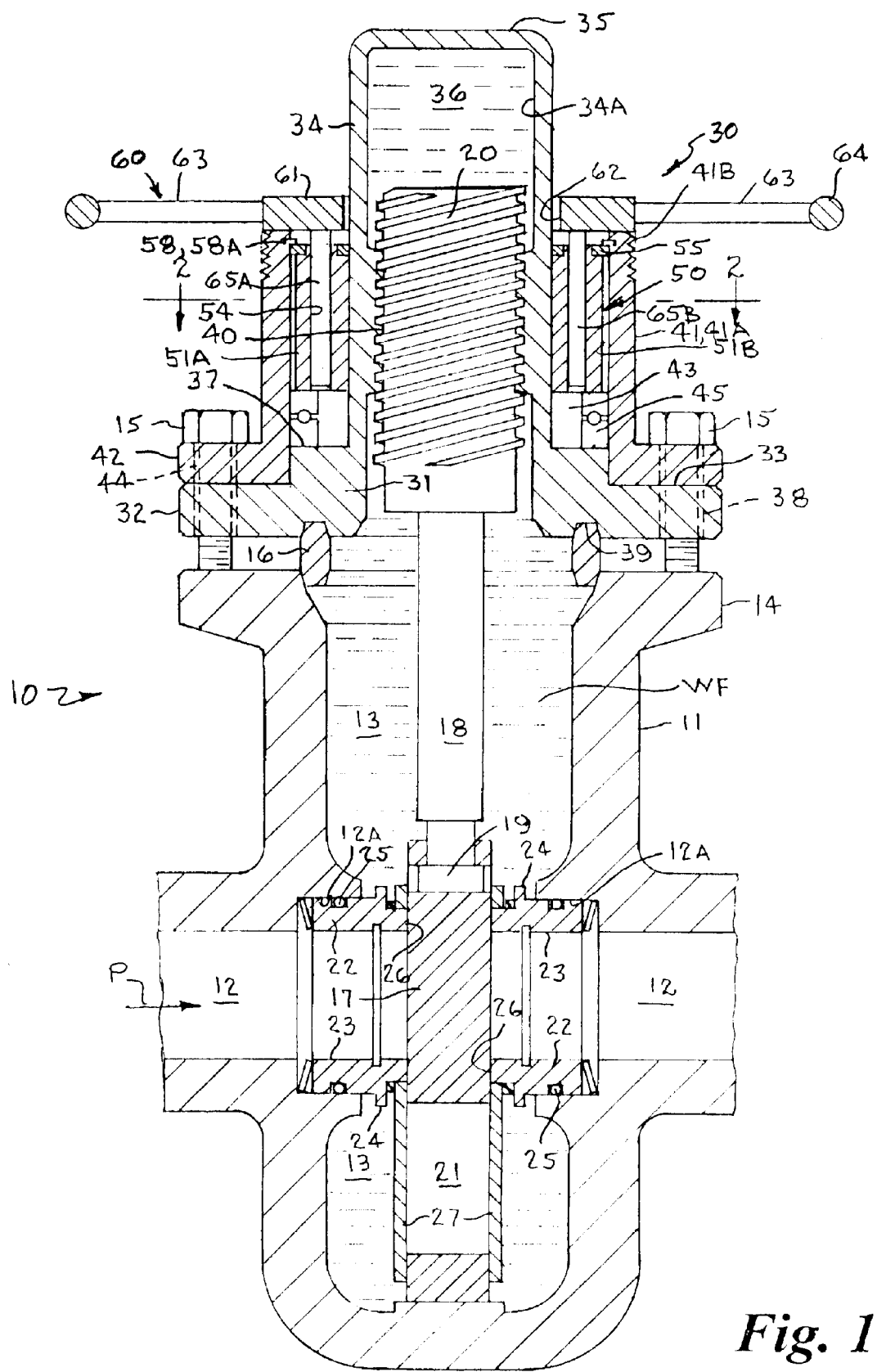
FIG. 1 is a longitudinal cross section of a gate valve having a harmonic drive and locking mechanism in accordance with the present invention.

The description which follows, and the embodiments described therein, are provided by way of illustration of an example of a particular embodiment, or examples of particular embodiments, of the principles of the present invention. These examples are provided for the purposes of explanation, and not of limitation, of those principles and of the invention. In the description which follows, like parts are marked throughout the specification and the drawings with the same respective reference numerals. The drawings are not necessarily to scale and in some instances proportions may have been exaggerated in order more clearly to depict certain features of the invention.

Referring to the drawings by numerals of reference, there is shown in FIG. 1, a rising stem gate valve 10 having a bonnet assembly 30 that houses a harmonic drive and locking mechanism in accordance with the present invention. The rising stem gate valve 10 is of conventional construction and the illustrated embodiment is shown for purposes of example and not limited thereto. The gate valve 10 includes a valve body 11 which has an elongate flow passage 12 therethrough. As used herein, with respect to the valve components, terms such as "longitudinal", "circumferential", and "radial" will be used with reference to the flow passage 12 and the corresponding bores of the valve seats, unless otherwise noted. Also, terms such as "upwardly" and "downwardly" will refer to the apparatus as it is shown in the drawings, although it should be understood that the apparatus might be disposed in other positions in actual use, so that these latter terms should not be construed in a limiting sense.

As used herein, the terms such as "harmonic drive" and "harmonic screw drive" refer to a mechanism for converting rotary motion to linear motion wherein a radially flexible sleeve having internal threads surrounds a longitudinal threaded shaft and at least two wave generating rollers disposed between the flexible sleeve and a relatively radially non-flexible sleeve rotate about the flexible sleeve pressing in radially inward to assume an elliptical configuration and engage the threads of the radially flexible sleeve with the threaded shaft at two diametrically opposed locations, with intermediate diametrically opposed locations of non-engagement such that the progressively engaged threads at circumferentially spaced locations causes relative motion axially to convert the rotary motion to linear motion and threaded shaft is driven longitudinally.

The side portions of valve body 11 adjacent the opposite ends (not shown) of flow passage 12 are adapted for connection into a flow conductor such as a pipeline or other conduit. It should be understood that the opposed ends may be provided with conventional flanged, threaded, welded or clamp-type connection means, conventional in the art and therefore not shown. The valve body 10 has a central hollow cavity which intersects the flow passage 12 and defines a gate chamber 13. The upper end of the valve body terminates in a flanged portion 14 to which the valve bonnet assembly 30 (described hereinafter) is connected by bolts 15, or by studs and nuts or cap screws. A conventional gasket or metal seal 16 is provided at the interface of the valve body 11 and valve bonnet 30 to form a sealing relation therebetween. In a preferred embodiment, a metal seal 16 is used to provide a metal-to-metal seal between the valve body and the bonnet assembly.

A valve element in the form of a slab-type gate 17 is mounted in the valve body 11 and disposed transverse to the flow passage 12, and is also movable within the body in a direction transverse to the flow passage 12, more particularly in a vertical direction as shown in the drawing. A valve stem 18 is connected to the upper end of gate 17 by pinning or mating formations 19 on the lower end of the valve stem and a slot in the upper end of the gate, such that the stem and the valve move together linearly and in a manner that permits the valve gate to "float", i.e., make small departures from alignment with the valve stem for effective sealing cooperation with the valve seats (described below). It should be understood that, alternatively, the valve gate 17 may be of conventional two-piece split slab type gate construction.

The valve stem 18 may be connected to the upper end of the gate 17 such that the stem and the valve move together linearly and in a manner that permits the stem to rotate relative to the gate. For example the bottom end of the stem 18 may have a circular portion at which is rotatably receive in a complementary shaped transverse slot in the upper end of the valve gate. Alternatively, the valve stem 18 may be connected to the upper end of the gate 17 such that the stem and the valve move together linearly and in a manner that does not permit the stem to rotate relative to the gate. For example, the valve stem may have a T-shaped lower end portion which loosely interlocks with a complementary T-shaped transverse slot in the upper end of the valve gate. The two valve seats (described below) confine the valve gate 17 to a plane that is perpendicular to the axis of the flow passage 12.

The valve stem 18 extends upwardly through the gate chamber 13 into the bonnet 30 and has an externally threaded upper portion 20. The upper portion of the gate 17 is solid such that when the gate is in its lowermost position as shown, the solid portion lies transversely across the flow passage 12 to close the valve. The lower portion of the gate 17 has a bore or port 21 extending therethrough parallel to the flow passage 12. When the gate 17 is moved upwardly, the port 21 is brought into alignment with flow passage 12 to close the valve.

It should be understood that, alternatively, the gate 17 may be provided with solid lower portion and a bore or port extending through an upper portion such that when the gate is in its uppermost position, the solid portion lies transversely across the flow passage to close the valve, and when moved to its lowermost position the port is brought into alignment with the flow passage 12.

The flow passage 12 is counterbored, as indicated at 12A, at its points of intersection with the gate chamber 13, and annular valve seats 22 are mounted in the counterbores on opposite sides of the gate 17. The valve seats 22 have a cylindrical sleeve-like body surrounding a central bore 23 and an annular flange 24 extending radially outwardly from one end. The seat body may be provided with a sealing element 25 disposed in an annular groove on the circumference of the body which engages the inner surface of the counterbore 12A in a sliding seal relation. The face of the annular flange 24 defines an annular contact face 26 for engagement with the gate 17. The faces may be planar, or may have a raised surface surrounding the central bore for sliding engagement with the planar side of the gate 17, and to provide a metal-to-metal sealing area. Alternatively, the faces of the annular flange 24 of the valve seats 22 may be provided with a sealing element disposed in an annular groove surrounding the central bore 23 which engages the planar side of the gate 17 in a sliding seal relation. In the illustrated example, the valve seats 22 are provided with raised contact faces 26 which pass through holes in the upper ends of a pair of conventional substantially planar rectangular gate guide plates 27 and the contact faces provide a metal-to-metal sealing area for sliding engagement with the planar sides of the gate 17.

When the valve is in its closed position, as shown, pressure upstream acts in the direction of arrow P to urge the gate 17 against the contact face 26 of the downstream valve seat with a force proportional to pressure. This increases the frictional forces between the gate and downstream seat, which in turn increases the force normally necessary to rotate the stem and open the valve.

Figure 2:
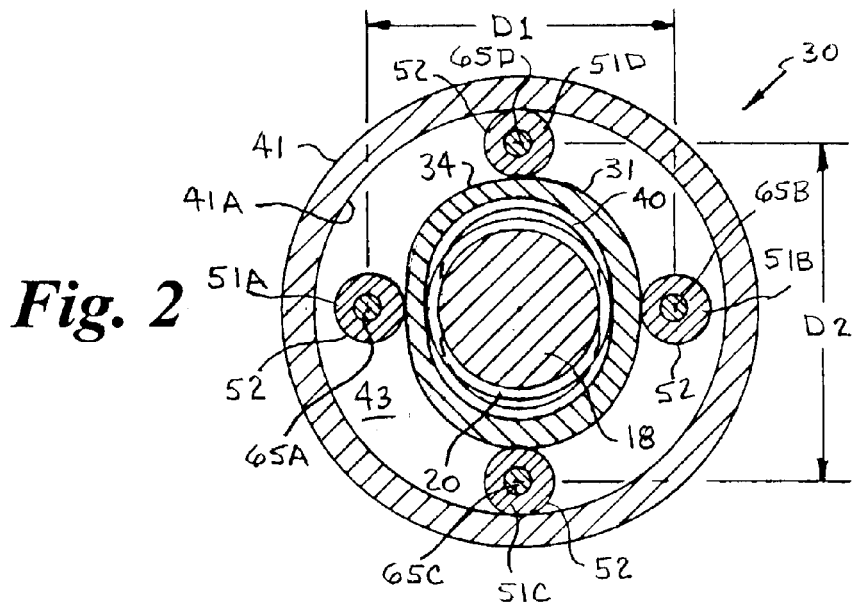
FIG. 2 is a transverse cross section taken along lines 2-2 through the bonnet assembly of the gate valve of FIG. 1, showing the threads of the flexible tubular portion of the valve bonnet pressed into engagement with the threads of the valve stem at two diametrically opposed locations, with intermediate diametrically opposed locations of non-engagement, the major axis of the elliptical configuration being exaggerated to more clearly illustrate the principle of operation.

Referring additionally to FIG. 2, as disclosed briefly above, a valve bonnet assembly 30 that houses a harmonic drive and locking mechanism is secured to the flanged portion 14 of the upper end of the valve body 11. The bonnet assembly 30 has a main body 31 with a radial flange 32 at a bottom end, a cylindrical raised portion on the top end of the bottom flange spaced radially inward from the outer diameter of the bottom flange defining a first flat annular shoulder 33, and a central elongate hollow tubular portion 34 that extends upwardly from the first flat annular shoulder and terminates at a top end wall 35 defining an interior valve stem chamber 36. The exterior of the hollow tubular portion 34 is spaced a distance inwardly from the first flat annular shoulder 33 to define a second flat annular shoulder 37. The radial flange 32 at the bottom end of the main body 31 is provided with axially aligned holes 38 therethrough in circumferentially spaced relation for receiving bolts 15, studs or cap screws. The bottom face of the radial flange 32 of the main body 31 has an annular groove 39 for receiving the conventional gasket or metal seal 16 at the interface of the valve body 11 and valve bonnet assembly 30 to form a sealing relation therebetween. In a preferred embodiment, a metal seal 16 is used to provide a metal-to-metal seal between the valve body and the bonnet assembly.

It should be understood from the foregoing that the gate chamber 13 of the valve body 11 and the stem chamber 36 of the main body 31 of the bonnet 30 are in fluid communication with one another. A working fluid WF, such as low-viscosity oil, substantially fills the gate chamber 13 of the valve body 11 and the stem chamber 36 of the main body 31 of the bonnet 30. A conventional sealable fill port and closure element such as a plug (conventional and therefore not shown) may be provided on the main body 31 of the bonnet 30 or other suitable location for introducing the fluid. The working fluid WF serves as a lubricant for the interior working components described hereinafter and also prevents penetration of abrasive particles into the threaded components. The planar rectangular gate guide plates 27 prevent the working fluid WF from entering the bore or port 21 in the gate 17 when it is in a closed position.

The interior diameter 34A of the central elongate hollow tubular portion 34 of the main body 31 is provided with an internally threaded area 40, the interior threads of the tubular portion and the external threads of the valve stem 18 are of the same hand, of the same thread form and the same pitch. The sidewall of the central elongate hollow tubular portion 34 bearing the internally threaded area 40 is formed of a material so as to be relatively flexible radially. For example, but not limited thereto, the central elongate hollow tubular portion 34 can be formed of spring steel. It should be understood that, depending upon the design pressure and the particular materials used, the entire main body portion 31, or just the sidewall, or just the portion of the sidewall of the central elongate hollow tubular portion 34 bearing the internally threaded area 40 may be formed of a material so as to be flexible radially inward toward the valve stem 18.

Prior to assembly (described hereinafter) the sidewall and the internally threaded area 40 of the central elongate hollow tubular portion 34 of the main body 31 initially has a circular transverse cross section and the diameter of the internal threads is slightly larger than the diameter of the external threads 20 of the valve stem 18, such that the threads are not meshed. For example, but not limited thereto, the internal threads 40 of the hollow tubular portion 34 of the main body 31 main may be approximately 0.039" to 0.078" (1 mm to 2 mm) larger than the diameter of the external threads 20 of the valve stem 18. As stated above, the sidewall bearing the internally threaded area 40 of the central elongate hollow tubular portion 34 is formed of a material that enables it to be flexible enough so as to be elastically deformable out-of-round from its normal circular transverse cross-sectional shape.

A hollow cylindrical outer sleeve 41 having a sidewall 41A with an open top end, and a radial flange 42 at a bottom end is received on the first annular shoulder 33 and surrounds the exterior of the hollow tubular portion 34 in radially spaced relation to define an annulus 43 therebetween. The sidewall 41A of the outer sleeve 41 is formed of a material so as to be relatively rigid radially. It should be understood that, depending upon the design pressure and the particular materials used, the entire outer sleeve 41, or just the sidewall 41A, of the outer sleeve may be formed of a material so as to be rigid or radially inflexible.

The radial flange 42 at the bottom end of the cylindrical outer sleeve 41 is provided with holes 44 therethrough disposed in radially spaced circumferential relation, so as to be axially aligned with the holes 38 in the main body 31 through which the bolts 15, studs or cap screws are passed to secure both the main body 31 and the outer sleeve 41 to the valve body 11.

A thrust bearing 45 is supported on the second annular shoulder 37 in the lower end of the annulus 43 between the sidewall 41A of the outer sleeve 41 and sidewall of the tubular portion 34 of the main body 31.

Figure 3:
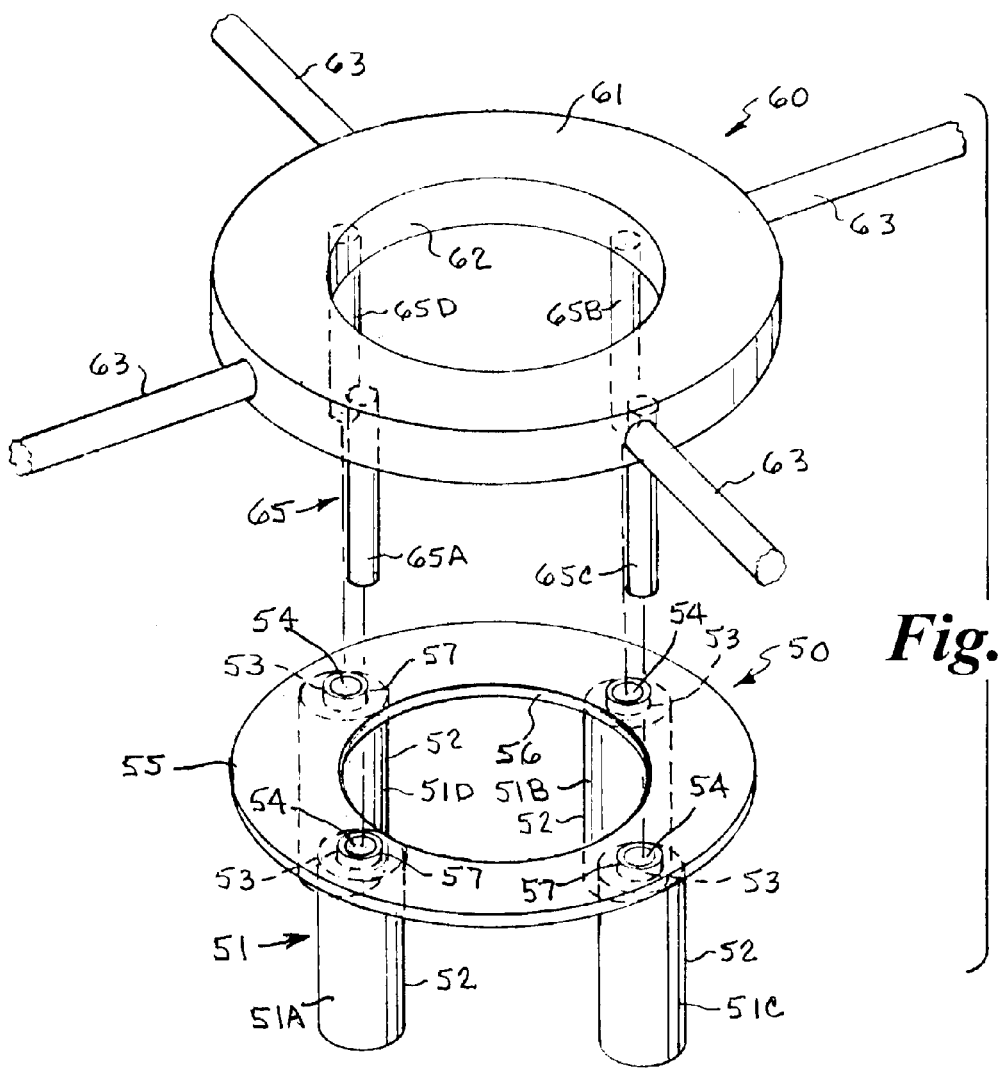
FIG. 3 is an exploded perspective view of the roller assembly and removable handwheel roller drive member of the present invention.

Referring additionally to FIG. 3, a roller assembly 50 is rotatably disposed in the annulus 43 between the relatively radially rigid sidewall 41A of the outer sleeve 41 and the relatively radially flexible sidewall of the tubular portion 34 of the main body 31 and supported on the thrust bearing 45. The roller assembly 50 includes a plurality of rollers 51, each of which has a cylindrical body 52 with a reduced diameter neck portion 53 at a top end and central bore 54 extending therethrough, and a thin circular disk 55 having a central hole 56 therethrough which encircles the sidewall of the tubular portion 34 of the main body 31 of the bonnet 30 and radially spaced holes 57 therethrough in which the neck portions 53 of the rollers 51 are rotatably received. The thin circular disk 55 is retained in the annulus 43 by a retaining element, such as a snap ring 58 received in a snap ring groove 58A at the upper end of the sidewall 41A of the outer sleeve 41. The roller assembly 50 is of a length approximately the same as the length of the internally threaded area 40 of the relatively flexible sidewall of the elongate hollow tubular portion 34 of the main body 31 of the bonnet and is disposed at approximately the same level.

As best seen in the illustrated example of FIG. 2, there are four rollers 51A through 51D, arranged in two circumferentially spaced diametrically opposed pairs. The distance D1 between the centerlines of only two opposite rollers 51A and 51B is smaller than the distance between the centerlines of the other two opposite rollers 51C and 51D. For example, but not limited thereto, the distance D1 between the centerlines of the two opposite rollers 51A and 51B may be approximately 0.039" to 0.078" (1 mm to 2 mm) smaller than the distance between the centerlines of the other two opposite rollers 51C and 51D.

As discussed briefly above, prior to assembly, the sidewall and internally threaded area 40 of the central elongate hollow tubular portion 34 of the main body 31 initially has a circular transverse cross section and the diameter of the internal threads 40 is slightly larger than the diameter of the external threads of the valve stem 18, such that the threads are not meshed. The roller assembly 50 is installed by pressing it into the annulus 43 between the relatively radially rigid sidewall 41A of the outer sleeve 41 and the relatively radially flexible sidewall of the tubular portion 34 of the main body 31. Due to the shorter distance D1 between the centerlines of the two opposed rollers 51A and 51B, those two rollers will rotatably engage the exterior of the relatively radially flexible sidewall of the tubular portion 34 of the main body 31 of the bonnet and press it radially inward to assume an elliptical configuration such that the threads 40 on the interior of the hollow tubular portion 34 are engaged with the exterior threads 20 of the valve stem 18 at two diametrically opposed locations, with intermediate diametrically opposed locations of non-engagement. The other two rollers 51C and 51D having a longer distance D2 between their centerlines will rotatably engage the interior diameter of the relatively radially rigid sidewall 41A of the outer sleeve 41. The two opposed rollers 51A and 51B having the shorter distance D1 between their centerlines will also serve as wave generators in a harmonic drive operation during rotation of the roller assembly 50, as described below. The major axis of the elliptical configuration is shown exaggerated so as to more clearly illustrate the principle of operation.

During installation of the roller assembly 50, a grease, for example but not limited thereto, such as a commercially available wheel bearing or axle grease may be introduced into the annulus to lubricate and weatherproof the components inside the annulus. Some such greases include white lithium, and/or molybdenum/graphite.

A removable handwheel 60 is used to rotate the roller assembly 50. The handwheel 60 has a central hub 61 with a central bore 62 extending therethrough which is sized to be received and surround the sidewall of the tubular portion 34 of the main body 31 of the bonnet 30, and has radially extending members 63 extending outwardly therefrom which may be used as handles, or may be connected an outer circular ring 64 for rotating the handwheel in a conventional manner.

A series of rods 65 extend vertically downward from the bottom surface of the hub 61, and are sized to be slidably received in the central bores 54 of the rollers 51 and extend substantially the length thereof. In the illustrated example of FIGS. 2 and 3, there are four rods 65A through 65D, arranged in two circumferentially spaced diametrically opposed pairs. The distance D1 between the centerlines of only two opposite rods 65A and 65B is smaller than the distance between the centerlines of the other two opposite rods 65C and 65D, corresponding the spacing of the rollers 51 described above.

As described above, and as seen in FIG. 2, the two opposed rollers 51A and 51B having the shorter distance between their centerlines serve as generators in a harmonic drive operation during rotation of the handwheel 60, and those two rollers rotatably engage the exterior of the relatively radially flexible sidewall of the tubular portion 34 of the main body 31 of the bonnet and press it radially inward to assume an elliptical configuration such that the threads 40 on the interior of the hollow tubular portion 34 are engaged with the exterior threads 20 of the valve stem 18 at two diametrically opposed locations, with intermediate diametrically opposed locations of non-engagement. The other two rollers 51C and 51D having a longer distance D2 between their centerlines will rotatably engage the interior diameter of the relatively radially rigid sidewall 41A of the outer sleeve 41.

When the hand wheel 60 is installed with the rods 65 received in the rollers 51, and the handwheel 60 is rotated, the rods drive the roller assembly 50 about the central longitudinal axis of the valve stem 18 in a clockwise or counterclockwise direction. During rotation, the two diametrically opposed rollers 51A and 51B rotatably engage and rotate around the exterior of the tubular portion 34 of the main body 31 of the bonnet and press it radially inward to assume an elliptical configuration whereby the threads 40 on the interior of the hollow tubular portion 34 are engaged with the exterior threads 20 of the valve stem 18 at two diametrically opposed circumferentially spaced locations, with intermediate diametrically opposed locations of non-engagement such that the engaged threads at circumferentially spaced locations causes relative motion axially to convert the rotary motion to linear motion and the valve stem and the gate 17 connected at the bottom of the valve stem are driven longitudinally upward or downward between the open and closed positions, depending upon which direction the handwheel is rotated.

The handwheel 60 with the depending rods 65 also serves as a key for operating the valve. When the handwheel 60 is removed, the threads 40 on the interior of the hollow tubular portion 34 remain engaged with the exterior threads 20 of the valve stem 18 at two diametrically opposed circumferentially spaced locations to lock the gate in the open or closed position, and thereby prevent tampering and opening or closing of the valve by unauthorized persons. Opening and closing of the valve requires a handwheel having the rod spacing as described above.

Figure 4:
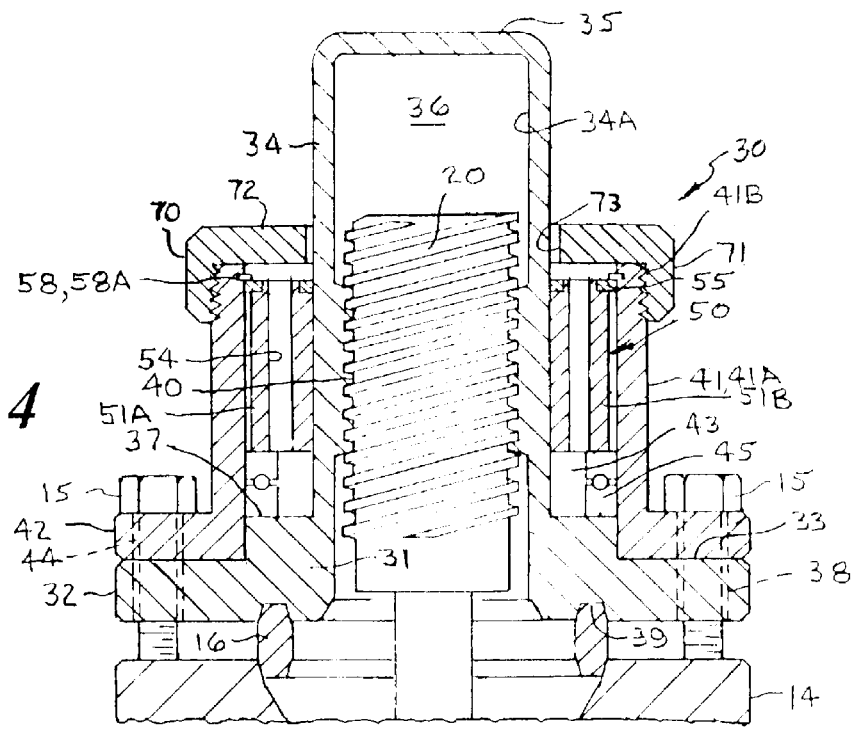
FIGS. 4 and 5 are longitudinal cross sections of the upper portion of the bonnet assembly with the hand wheel removed and illustrating alternate embodiments of an end cap, and a plug or gland, respectively, for enclosing the upper end of the annulus of the bonnet assembly.
Figure 5:
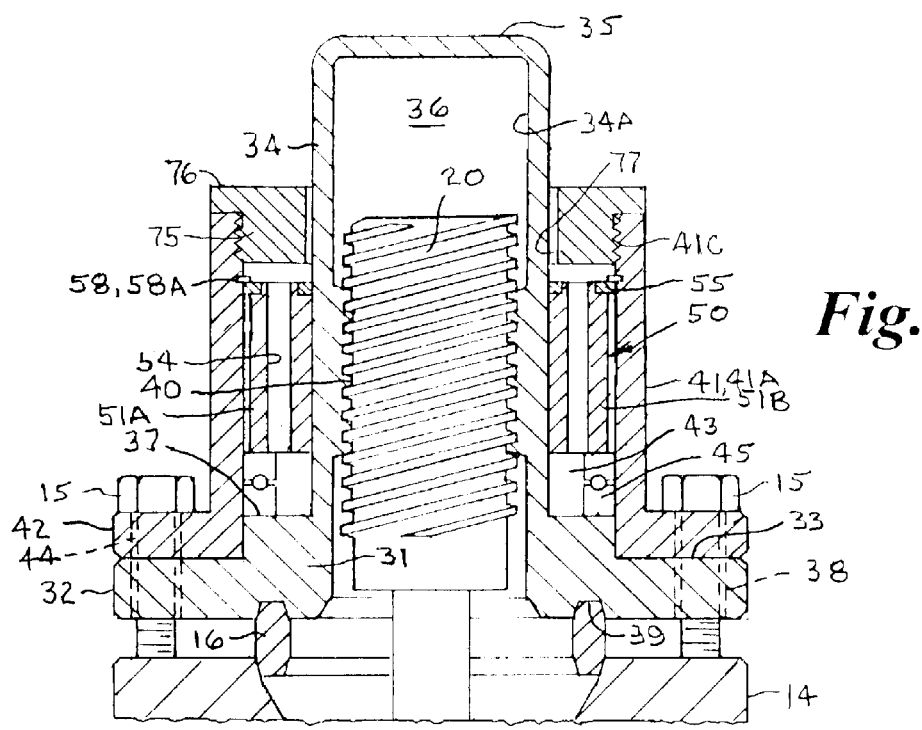

The upper end of the exterior of the sidewall 41A of the outer sleeve 41 may be provided with an externally threaded portion 41B on which a removable end cap 70 is threadedly received when the handwheel 60 is removed, to enclose the annulus 43 and the roller assembly components disposed therein, as shown in FIG. 4. The end cap 70 has an internally threaded circumferential sidewall 71 and a top wall 72 with a central bore 73 extending therethrough which is sized to be received and surround the tubular portion 34 of the main body 31 of the bonnet 30 to enclose the annulus 43 and the components disposed therein and prevent dust and other debris from entering the annulus. Alternatively, as shown in FIG. 5, the upper end of the interior of the sidewall 41A of the outer sleeve 41 may be provided with an internally threaded portion 41C above the snap ring groove 58A which threadedly receives the externally threaded body portion 75 of a plug or gland 76 having a central bore 77 sized to be received and surround the tubular portion 34 of the main body 31 of the bonnet 30 when the gland is installed, to enclose the annulus 43 and the components disposed therein and prevent dust and other debris from entering the annulus.

Although only four rollers have been shown for purposes of example, it should be understood that only two wave generating rollers may be may be used, or there may be more than four rollers arranged in diametrically opposed pairs with at least two wave generating rollers having a shorter distance between their centerlines than the other rollers so as to engage and rotate around the exterior of the tubular portion 34 of the main body 31 of the bonnet and press it radially inward to engage the threads at diametrically opposed locations.

It should also be understood from the foregoing that the gate chamber 13 of the valve body 11 and the stem chamber 36 of the main body 31 of the bonnet 30 are in fluid communication with one another and the valve stem 18 is completely enclosed and surrounded by the working fluid WF, thus no valve stem packing is required.

Figure 6:
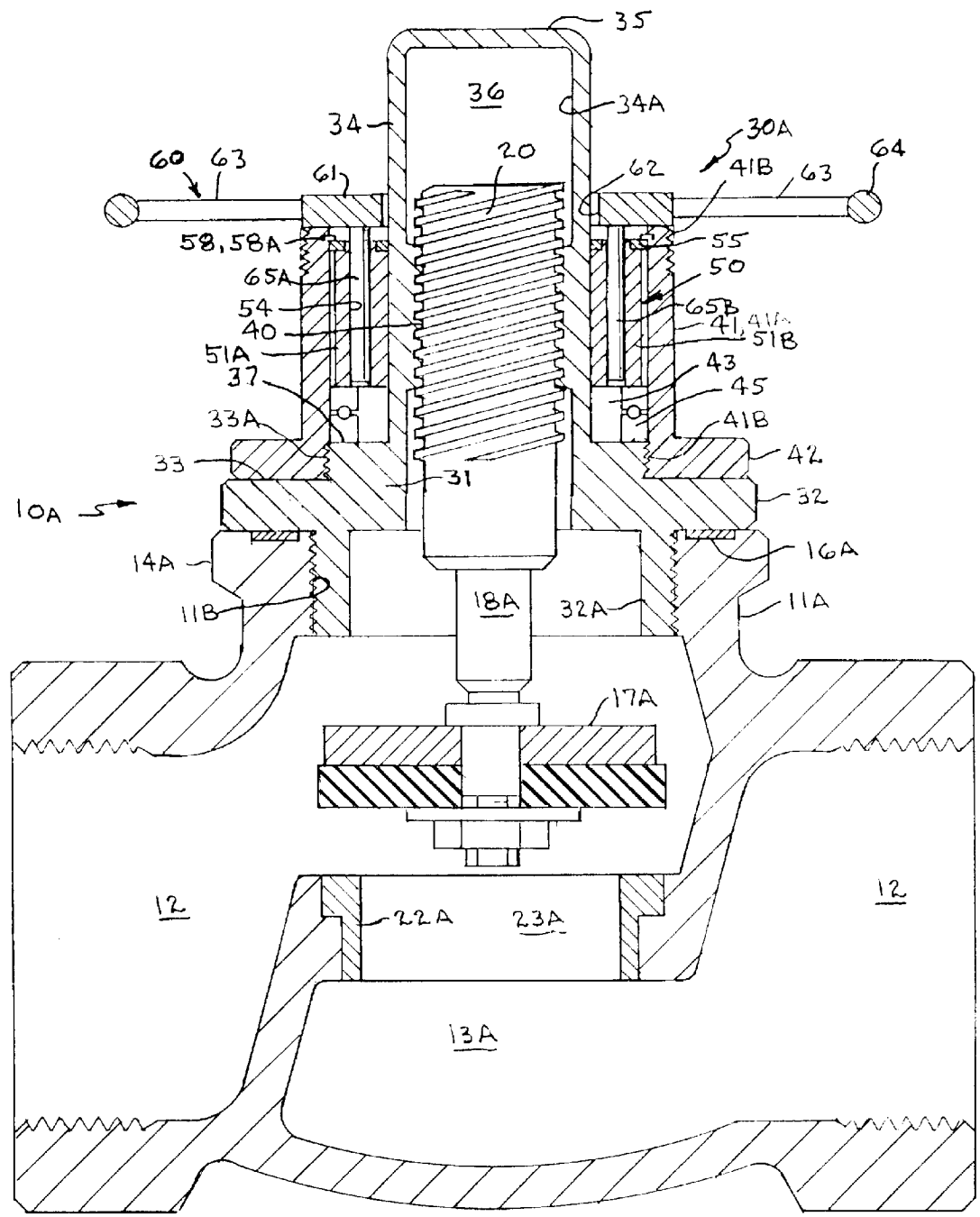
FIG. 6 is a longitudinal cross section of a globe valve having a harmonic drive and locking mechanism in accordance with the present invention.

Referring now to FIG. 6, there is shown an embodiment of a globe valve 10A equipped with a bonnet assembly 30A having the harmonic drive and locking mechanism in accordance with the present invention, as described above. The components which have been previously shown and described are assigned the same numerals of reference, but will not be described again in detail here to avoid repetition.

In this embodiment, the valve body 11A is of conventional construction and the illustrated embodiment is shown for purposes of example only and not limited thereto. The valve stem 18 has a conventional horizontal plug or disk 17A connected at the bottom end of the stem to serve as the valve element to open or close fluid flow through the valve, rather than a gate. As with the previous embodiment, the valve stem 18A and the plug disk 17A connected at the bottom end move together as a unit.

The valve body 11A has opposed outer ends adapted for connection into a flow conductor such as a pipe or other conduit. In the illustrated example, the outer ends are shown to be threaded, however, it should be understood that the opposed ends may be provided with conventional flanged, welded or clamp-type connection means. The body 11A has a central hollow cavity which intersects a flow passage 12 extending between the opposed ends and defines a central chamber 13A. The valve body 11A also has a conventional valve seat support surface having a passageway through which the fluid flows and in which a conventional valve seat 22A is mounted which has a central bore 23A with a central axis disposed in axial alignment with the longitudinal axis of the valve stem 18A and a sealing surface on which the plug or disk 17A is sealingly engaged in the lowermost closed position.

The upper end of the valve body 11A terminates in a flanged portion 14A to which the valve bonnet assembly 30A that houses the harmonic drive and locking mechanism is secured. In this embodiment the upper end of the valve body 11A has an internally threaded portion 11B and a conventional metal seal or gasket 16A is provided at the interface of the valve body 11A and valve bonnet 30A to form a sealing relation therebetween.

Also in this embodiment, the radial bottom flange 32 at the bottom end of the main body 31 of the valve assembly 30A has cylindrical externally threaded extension 32A which is threadedly engaged in the threaded portion 11B at the upper end of the valve body 11A. The cylindrical raised portion 34 on the top end of the bottom flange 32 defining the first flat annular shoulder 33 is provided with external threads 33A, and the lower end of the hollow cylindrical outer sleeve 41 is provided with internal threads 41B and is threadedly received on externally threaded raised portion so as to surround the second flat annular shoulder 37 and the exterior of the hollow tubular portion 34 of the main body 31 in radially spaced relation to define the annulus 43 therebetween.

Thus, in this embodiment, the radial flange 32 at the bottom end of the main body 31 and the radial flange 42 at the bottom end of the outer sleeve 41 do not have axially aligned holes therethrough for receiving bolts, studs or cap screws. However, it should be understood that the upper end of the valve body and the bonnet assembly may have flanged portions which are connected as shown and previously described with reference to FIG. 1. Also, in this embodiment, the central chamber 13A of the valve body 11A and the stem chamber 36 of the main body 31 of the bonnet 30A are not filled with a working fluid.

As with the previous embodiment, the interior diameter 34A of the central elongate hollow tubular portion 34 of the main body 31 is provided with the internally threaded area 40, and the sidewall of the central elongate hollow tubular portion 34 bearing the internally threaded area is formed of a material so as to be relatively flexible radially, and the sidewall 41A of the outer sleeve 41 is formed of a material so as to be relatively rigid radially, as described previously.

A thrust bearing 45 is supported on the second annular shoulder 37 in the lower end of the annulus 43 between the sidewall 41A of the outer sleeve 41 and exterior of the tubular portion 34 of the main body 31, and the roller assembly 50 as previously described is rotatably disposed in the annulus 43 between the relatively radially rigid sidewall 41A of the outer sleeve 41 and the relatively radially flexible sidewall of the tubular portion 34 of the main body 31 and supported on the thrust bearing 45. A removable handwheel 60, as described previously, is used to rotate the roller assembly 50.

As with the previous embodiment, when the handwheel 60 is installed with the rods 65 received in the rollers 51, and the handwheel is rotated, the rods drive the roller assembly 50 about the central longitudinal axis of the valve stem 18A in a clockwise or counter-clockwise direction. During rotation, the two diametrically opposed rollers 51A and 51B rotatably engage and rotate around the exterior of the tubular portion 34 of the main body 31 of the bonnet and press it radially inward to assume an elliptical configuration whereby the threads 40 on the interior of the hollow tubular portion 34 are engaged with the exterior threads 20 of the valve stem 18A at two diametrically opposed circumferentially spaced locations, with intermediate diametrically opposed locations of non-engagement such that the engaged threads at circumferentially spaced locations causes relative motion axially to convert the rotary motion to linear motion and the valve stem and the plug or disk 17A connected at the bottom of the valve stem are driven longitudinally upward to open the valve or downward to close the valve.

Although the roller assembly and harmonic drive mechanism has been shown and described for purposes of example, as being rotated by a handwheel, it should be understood that the roller assembly and harmonic drive mechanism may be rotated by other means. For example, the handwheel may be replaced by rotary drive device which attaches to the outer sleeve 41 and has a rotating member releasably connected with roller assembly 50 and may be powered mechanically, electrically, pneumatically, or hydraulically to rotate the rollers around the exterior of the tubular portion 34 of the main body 31 of the bonnet and press it radially inward to engage the threads at diametrically opposed locations for raising and lowering the stem.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. A hermetic packingless rising stem valve assembly, comprising:

a valve having a body with inlet and outlet conduits defining a flow passage therethrough, a valve chamber intersecting and in fluid communication with said flow passage, and at least one valve seat mounted in said valve body having central bore surrounded by a contact face for receiving and engaging a valve element in a fluid sealing relation;

said valve element disposed within said valve chamber and movable between an open position in which a fluid can flow through said flow passage between said inlet and outlet conduits, and a closed position in which said valve element is engaged with said valve seat contact face to block fluid flow between said inlet and outlet conduits;

an elongate valve stem having an externally threaded portion at an upper end and a lower end connected with said valve element such that rotation of said valve stem will move said valve stem and said valve element longitudinally relative to said valve body between said open and closed positions;

a valve bonnet assembly having a main body member mounted on said valve body at said valve chamber open end and an elongate tubular portion having a sidewall and an end wall defining a stem chamber that completely encloses said valve stem upper end, at least a portion of said tubular portion sidewall formed of a material so as to be relatively flexible radially inward toward said valve stem, and an outer sleeve member mounted on said main body having a sidewall surrounding said elongate tubular portion in radially spaced relation defining an annulus therebetween, said outer sleeve sidewall formed of a material so as to be relatively rigid radially, said flexible portion of said tubular portion sidewall having an internally threaded portion, the threads of said tubular portion and said external threads of said valve stem being of the same hand, of the same thread form and the same pitch;

seal means disposed between said valve body and said bonnet assembly for connecting said bonnet assembly and said valve body together in fluid sealing relation wherein said valve chamber and said stem chamber are in fluid communication and sealed from the environment;

a roller assembly rotatably disposed in said annulus to rotate around said main body tubular portion including a thin circular disk having a central hole therethrough which encircles said sidewall of said main body tubular portion and radially spaced holes therethrough, and a plurality of rollers each having an elongate cylindrical body with a reduced diameter neck portion at a top end rotatably received in a respective said radially spaced hole;

said plurality of rollers including at least two wave generator rollers rotatably engaged on the exterior of said tubular member side wall relatively flexible portion in diametrically opposed relation to rotatably engage the exterior of said tubular portion sidewall and press said internally threaded portion radially inward to assume an elliptical configuration such that the interior threads of said tubular portion are engaged with the exterior threads of the valve stem at two diametrically opposed circumferentially spaced locations, with intermediate diametrically opposed locations of non-engagement;

retaining means at an upper end of said sidewall of said the outer sleeve for retaining said roller assembly in said annulus; and rotation means connected with said roller assembly for rotating said roller assembly around said tubular portion sidewall such that upon rotation said engaged threads at two diametrically opposed circumferentially spaced locations causes relative motion axially to convert the rotary motion to linear motion thereby driving said valve stem and said valve element longitudinally between said open and closed positions.

2. The valve assembly according to claim 1, wherein said seal means between said valve body and said bonnet assembly is comprised of metal, and continuous metal-to-metal sealing areas are provided between said valve body and said bonnet assembly, and between said at least one valve seat and said valve element.

3. The valve assembly according to claim 1, further comprising:

a low-viscosity working fluid contained within said valve chamber and said stem chamber to provide lubrication for components disposed in said valve chamber and said stem chamber and prevent penetration of abrasive particles into threaded components.

4. The valve assembly according to claim 1, wherein said rotating means comprises a handwheel removably connected with said roller assembly for rotating said roller assembly.

5. The valve assembly according to claim 1, further comprising:

a bearing member disposed in said annulus engaged with said roller assembly to facilitate rotation of said roller assembly around said sidewall of said tubular portion of said main body of said bonnet assembly.

6. The valve assembly according to claim 1, wherein said roller assembly is of a length approximately the same as the length of said internally threaded portion of said sidewall of said main body tubular portion and disposed at approximately the same level.

7. The valve assembly according to claim 1, wherein said plurality of rollers are arranged in circumferentially spaced diametrically opposed pairs, two of which are said wave generator rollers; and said wave generator rollers having a distance between the centerlines thereof which is smaller than the distance between the centerlines of other diametrically opposed pairs; wherein said wave generator rollers rotatably engage the exterior of said side wall of said tubular portion, as recited, and said other diametrically opposed pairs of said rollers rotatably engage the interior diameter of said outer sleeve sidewall.

8. The valve assembly according to claim 7, wherein said plurality of rollers each has a central bore extending therethrough;

said rotating means comprises a handwheel having a central hub with a central bore extending therethrough which is sized to be received and surround said sidewall of said tubular portion of said main body, and a series of rods extending vertically downward from a bottom surface of said hub arranged in circumferentially spaced diametrically opposed pairs corresponding to the spacing of said centerlines of said rollers and sized to be slidably received in said central bores of said rollers, whereby said handwheel rotates said roller assembly and serves as a key for operating said valve; and when said handwheel is removed, said threads of said tubular portion remain engaged with said threads of said valve stem to lock said valve element in said open or closed position, and thereby prevent tampering and opening or closing of the valve by unauthorized persons.

9. The valve assembly according to claim 1, further comprising:

a quantity of viscous weather resistant lubricating material disposed in said annulus to lubricate and weatherproof components of said roller assembly.

10. The valve assembly according to claim 1, wherein said valve is a gate valve;

said valve element comprises a gate having opposed planar faces;

said at least one valve seat comprises a pair of said valve seats mounted in said valve body in opposed relation with their said contact faces engaging respective planar sides of said gate in a sliding fluid sealing relation; and said gate having a solid portion which in said closed position is engaged with said valve seat contact faces to block fluid flow between said inlet and outlet conduits, and having a portion with a bore extending therethrough parallel to said central bore of said valve seats which in said open position allows fluid flow between said inlet and outlet conduits.

11. The valve assembly according to claim 10, further comprising:

a pair of substantially planar rectangular gate guide plates each disposed in opposed relation with opposed facing sides engaging respective planar sides of said gate in a sliding fluid sealing relation, and having a hole therethrough near one end through which said contact faces of said seats pass respectively.

12. The valve assembly according to claim 11, further comprising:

a low-viscosity working fluid contained within said valve chamber and said stem chamber to provide lubrication for components disposed in said valve chamber and said stem chamber and prevent penetration of abrasive particles into threaded components; and said gate guide plates are of a length sufficient to enclose said gate portion having said bore therethrough to prevent said working fluid in said valve chamber and said stem chamber from entering said gate bore when said gate is in said closed position.

13. The valve assembly according to claim 1, wherein said valve is a globe valve;

said valve element comprises a plug or disk;

said at least one valve seat comprises a valve seat mounted in a seat support surface in said valve body; and in said closed position said plug or disk is engaged with said valve seat contact face to block fluid flow between said inlet and outlet conduits.

14. A bonnet and stem drive assembly for connection to a rising stem valve having a body with inlet and outlet conduits defining a flow passage therethrough, a valve chamber intersecting and in fluid communication with said flow passage and having an open end, and at least one valve seat mounted in the valve body having central bore surrounded by a contact face, the bonnet and stem drive assembly comprising:

a valve bonnet assembly having a main body member adapted to be mounted on said valve body at said valve chamber open end and an elongate tubular portion having a sidewall and an end wall defining a stem chamber that completely encloses an upper end of a valve stem having external threads, at least a portion of said tubular portion sidewall formed of a material so as to be relatively flexible radially inward toward said valve stem upper end, and an outer sleeve member mounted on said main body having a sidewall surrounding said elongate tubular portion in radially spaced relation defining an annulus therebetween, said outer sleeve sidewall formed of a material so as to be relatively rigid radially, said flexible portion of said tubular portion sidewall having an internally threaded portion, the threads of said tubular portion and said external threads of said valve stem being of the same hand, of the same thread form and the same pitch;

a roller assembly rotatably disposed in said annulus to rotate around said main body tubular portion including a thin circular disk having a central hole therethrough which encircles said sidewall of said main body tubular portion and radially spaced holes therethrough, and a plurality of rollers each having an elongate cylindrical body with a reduced diameter neck portion at a top end rotatably received in a respective said radially spaced hole;

said plurality of rollers including at least two wave generator rollers rotatably engaged on the exterior of said tubular member side wall relatively flexible portion in diametrically opposed relation to rotatably engage the exterior of said tubular portion sidewall and press said internally threaded portion radially inward to assume an elliptical configuration such that the interior threads of said tubular portion are engaged with the exterior threads of the valve stem at two diametrically opposed circumferentially spaced locations, with intermediate diametrically opposed locations of non-engagement;

retaining means at an upper end of said sidewall of said the outer sleeve for retaining said roller assembly in said annulus; and rotation means connected with said roller assembly for rotating said roller assembly around said tubular portion sidewall such that upon rotation said engaged threads at two diametrically opposed circumferentially spaced locations causes relative motion axially to convert the rotary motion to linear motion thereby driving said valve stem and said valve element longitudinally between said open and closed positions.

15. The bonnet and stem drive assembly according to claim 14, further comprising:

a bearing member disposed in said annulus engaged with said roller assembly to facilitate rotation of said roller assembly around said sidewall of said tubular portion of said main body of said bonnet assembly.

16. The bonnet and stem drive assembly according to claim 14, wherein said plurality of rollers are arranged in circumferentially spaced diametrically opposed pairs, two of which are said wave generator rollers; and said wave generator rollers having a distance between the centerlines thereof which is smaller than the distance between the centerlines of other diametrically opposed pairs; wherein said wave generator rollers rotatably engage the exterior of said side wall of said tubular portion, as recited, and said other diametrically opposed pairs of said rollers rotatably engage the interior diameter of said outer sleeve sidewall.

17. The bonnet and stem drive assembly according to claim 16, wherein said plurality of rollers each has a central bore extending therethrough;

said rotating means comprises a handwheel having a central hub with a central bore extending therethrough which is sized to be received and surround said sidewall of said tubular portion of said main body, and a series of rods extending vertically downward from a bottom surface of said hub arranged in circumferentially spaced diametrically opposed pairs corresponding to the spacing of said centerlines of said rollers and sized to be slidably received in said central bores of said rollers, whereby said handwheel rotates said roller assembly and serves as a key for operating said valve; and when said handwheel is removed, said threads of said tubular portion remain engaged with said threads of said valve stem to lock said valve element in said open or closed position, and thereby prevent tampering and opening or closing of the valve by unauthorized persons.

* * * * *